(12) United States Patent
Groeppel et al.

(10) Patent No.: US 10,749,401 B2
(45) Date of Patent: Aug. 18, 2020

(54) ROTOR CAP FOR ELECTRIC GENERATORS

(71) Applicant: Siemens Aktiengesellschaft, Munich (DE)

(72) Inventors: Peter Groeppel, Erlangen (DE); Martin Johannes, Fuerth (DE); Claus Rohr, Schwetzingen (DE); Christian Seidel, Schwaig (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 685 days.

(21) Appl. No.: 15/300,608

(22) PCT Filed: Mar. 18, 2015

(86) PCT No.: PCT/EP2015/055651
§ 371 (c)(1),
(2) Date: Sep. 29, 2016

(87) PCT Pub. No.: WO2015/150077
PCT Pub. Date: Oct. 8, 2015

(65) Prior Publication Data
US 2017/0110924 A1    Apr. 20, 2017

(30) Foreign Application Priority Data
Mar. 31, 2014   (DE) .................. 10 2014 206 010

(51) Int. Cl.
*H02K 9/08*   (2006.01)
*H02K 9/12*   (2006.01)
(Continued)

(52) U.S. Cl.
CPC ................. *H02K 3/51* (2013.01); *H02K 5/02* (2013.01); *H02K 5/20* (2013.01); *H02K 7/1823* (2013.01); *H02K 15/0037* (2013.01)

(58) Field of Classification Search
CPC .. H02K 9/08; H02K 9/12; H02K 3/51; H02K 3/50; H02K 5/02; H02K 5/20
See application file for complete search history.

(56) References Cited

U.S. PATENT DOCUMENTS

| | | | |
|---|---|---|---|
| 5,928,736 A | 7/1999 | Parekh | 428/34.5 |
| 2006/0038462 A1 | 2/2006 | Holmes et al. | 310/270 |
| 2014/0125192 A1 | 5/2014 | Gröppel et al. | 310/270 |

FOREIGN PATENT DOCUMENTS

| | | | |
|---|---|---|---|
| DE | 19548321 C1 | 2/1997 | H02K 9/08 |
| DE | 19732949 A1 | 2/1999 | H02K 9/12 |

(Continued)

OTHER PUBLICATIONS

European Office Action, Application No. 15712564.2, 5 pages, dated Dec. 20, 2018.
(Continued)

*Primary Examiner* — Edgardo San Martin
(74) *Attorney, Agent, or Firm* — Slayden Grubert Beard PLLC

(57) ABSTRACT

A rotor cap for an electric generator, e.g., a high-speed turbogenerator, is disclosed, along with a production method for such rotor cap. The rotor cap is at least partially made of fiber-reinforced plastic material. The rotor cap may have cooling fluid passages, e.g., extending in an axial direction, in the area of the fiber-reinforced plastic material.

10 Claims, 6 Drawing Sheets

(51) Int. Cl.
- *H02K 5/20* (2006.01)
- *H02K 3/51* (2006.01)
- *H02K 5/02* (2006.01)
- *H02K 7/18* (2006.01)
- *H02K 15/00* (2006.01)
- H02K 9/00 (2006.01)
- H02K 9/10 (2006.01)
- H02K 5/00 (2006.01)

(56) References Cited

FOREIGN PATENT DOCUMENTS

| DE | 102010032827 A1 | 11/2011 | ............... H02K 1/32 |
|----|----|----|----|
| DE | 102011077861 A1 | 12/2012 | ............... H02K 3/51 |
| EP | 1628382 B1 | 11/2007 | ............... H02K 3/38 |
| WO | 2012/061856 A2 | 5/2012 | ............... H02K 3/51 |
| WO | 2015/150077 A1 | 10/2015 | ............... H02K 3/51 |

OTHER PUBLICATIONS

German Office Action, Application No. 102014206010.9, 8 pages, dated Mar. 16, 2015.

International Search Report and Written Opinion, Application No. PCT/EP2015/055651, 17 pages, dated Aug. 27, 2015.

FIG 1

| Cooling stator winding | Cooling rotor winding | Cooling sheet metal body | Output spectrum | Field of application |
|---|---|---|---|---|
| Air indirectly | Air indirectly | Air indirectly | 10-50 MVA | Industrial power plants |
| Air indirectly | Air radially | Air directly | 30-260 MVA | CC power plants |
| Hydrogen indirectly | Hydrogen directly | Hydrogen directly | 100-420 MVA | Gas turbine power plants |
| Hydrogen axially | Hydrogen directly | Hydrogen directly | 400-950 MVA | Large coal-fired power plants |
| Water directly | Hydrogen directly | Hydrogen directly | 600-1400 MVA | Largest coal-fired power plants, nuclear power plants |
| Water directly | Water directly | Hydrogen directly | 1000-1800 MVA | Nuclear power plants |

FIG 4
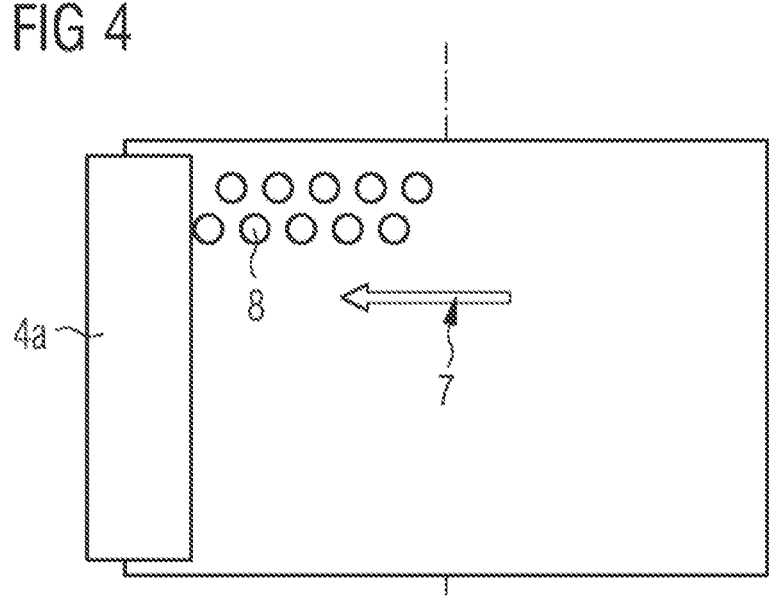
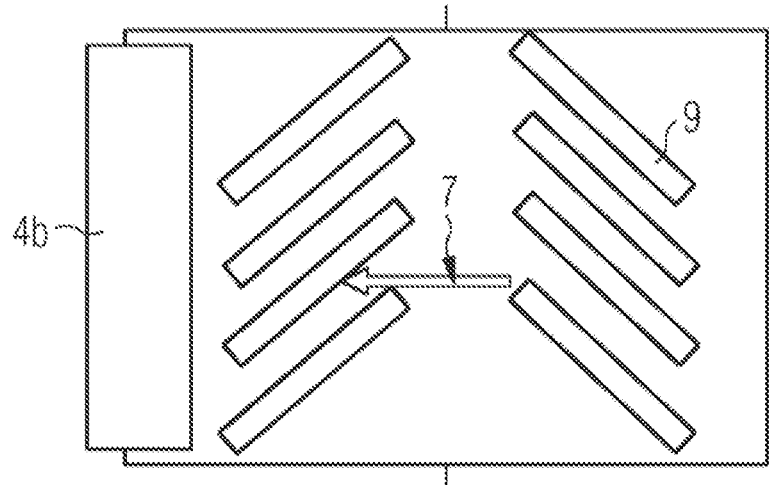
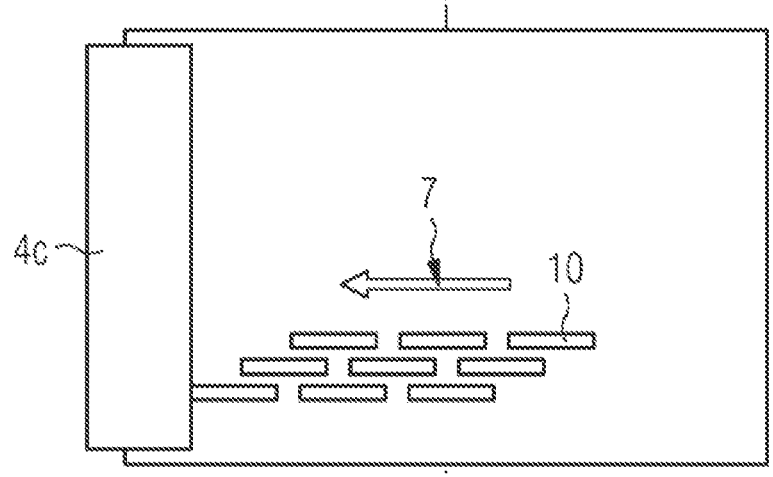

ROTOR CAP FOR ELECTRIC GENERATORS

CROSS-REFERENCE TO RELATED APPLICATIONS

This application is a U.S. National Stage Application of International Application No. PCT/EP2015/055651 filed Mar. 18, 2015, which designates the United States of America, and claims priority to DE Application No. 10 2014 206 010.9 filed Mar. 31, 2014, the contents of which are hereby incorporated by reference in their entirety.

TECHNICAL FIELD

The invention relates to a rotor cap for an electric generator, and to a production method therefor. The invention furthermore relates to such a generator. The invention is in particular advantageously applicable in high speed turbogenerators.

BACKGROUND

Electrical energy is nowadays generated almost exclusively in rotating electricity producers, known as generators. By far the greatest part of the electricity generated in generators originates from turbogenerators. These run at 3000 to 3600 revolutions per minute. The rotating magnetic field is generated by windings with alternating polarity which are excited by direct current. The windings emerge from the longitudinal grooves of the rotor at the body ends and form the end winding which is secured against centrifugal force. This prevents the copper windings (rotor end winding) that meet at the end from flying out as a result of centrifugal forces.

The rotor cap, in contrast to the rotor itself, is generally made of a high-alloyed non-magnetizable steel and, together with the slot wedges at the surface of the rotor, forms an electrically conductive cage which is known as the damper winding. The damper winding serves to reduce shock loads (pole wheel oscillations) and the heating of the rotor in the case of a load imbalance. In the case of symmetrical load, no alternating fields and thus also no eddy currents occur in the rotor, which is forged from solid steel. However, as a result of a load imbalance, a magnetic rotating field occurs in the steel core of the rotor, and this can result in eddy currents and in impermissible heating and, in extreme cases, in the destruction of the turbogenerator. This needs to be ruled out for the projected service life. These functions are taken on by the rotor caps. They are the most highly loaded components of the turbogenerator. The rotor caps are in most cases shrunk in an overhung manner onto the body ends and are secured against rotational and axial movements by a kind of bayonet connection, for example. On the side remote from the bodies, a support ring is in many cases shrunk into the rotor cap, said support ring absorbing the forces of the end windings that act in the longitudinal direction.

The development of ever larger power units is resulting in increasing stress on the rotor caps. Therefore, the structural and material design of the rotor caps is subject to the highest requirements. It is also necessary, with increasing output, in particular in turbogenerators, to step up cooling. It is known that air is predominantly used as cooling medium in generators in the range up to about 300 MVA. At greater outputs, hydrogen is also used as cooling fluid. The cooling fluid and the manner of cooling have consequences for the structural configuration of the generator, in particular also the coils in the stator and in the rotor. As far as the manner of cooling is concerned, a distinction is made between indirect and direct conductor cooling. Furthermore, it is known practice to cool generators using suction ventilation or pressure ventilation. In the case of suction ventilation, the cooling fluid is conducted in ducts from the main fan to the cooler. From there, the cooling medium flows without heating up as a result of fan losses and compression to the machine parts to be cooled, in particular also to the rotor coils. For flow generation, axial fans are generally used for cost reasons both in pressure ventilation and in suction ventilation in the case of air cooling. In the case of hydrogen cooling, radial fans and multistage axial fans are also used.

Hitherto, the rotor caps have generally been produced from metal or an alloy.

For example, EP 1628382 B1 discloses a structure in which the rotor caps or cap rings (both of these terms are used synonymously in the present document) are made of alloyed metal. Although optimum mechanical properties are realized in this case, both production times and production costs are very high and there is no design for cooling.

SUMMARY

One embodiment provides a rotor cap for an electric generator, wherein the rotor cap consists at least partially of fiber-reinforced plastic into which cooling fluid passages are incorporated.

In a further embodiment, the fibers have at least one preferred direction which comprises in particular at least substantially a circumferential direction of the rotor cap.

In a further embodiment, the fibers comprise carbon fibers.

In a further embodiment, the fibers comprise ceramic fibers, in particular aluminum oxide fibers.

In a further embodiment, the fibers comprise boron fibers.

In a further embodiment, the fibers are embedded in a matrix of resin, in particular epoxy resin.

In a further embodiment, the cooling fluid passages are gas passages.

In a further embodiment, the cooling fluid passages are holes or slots.

In a further embodiment, the edges of the cooling fluid passages are formed in a fluidic manner.

Another embodiment provides a method for producing a rotor cap by lamination, wherein, during the lamination of the fiber composite plastic, the cooling fluid passages are formed in an axial direction by the use of inserts, e.g., cylindrical inserts.

Another embodiment provides an electric generator, e.g., a turbogenerator, having at least one rotor cap, wherein the at least one rotor cap is a rotor cap as disclosed above.

BRIEF DESCRIPTION OF THE DRAWINGS

Example aspects and embodiments of the invention are described below with reference to the figures, in which:

FIG. 1 shows a table which lists turbogenerators, sorted in accordance with output spectrum, and specifies the cooling systems that are predominantly used therein.

FIGS. 4A-4C show example embodiments of cooling fluid passages, e.g., in the fiber-reinforced plastic of a rotor cap. FIG. 4A shows a first embodiment with ventilation holes that serve as a cooling fluid passage; FIG. 4B shows a second embodiment with ventilation slots that extend obliquely to a main load direction; and FIG. 4C shows a third embodiment with ventilation slots that extend along a main load direction.

FIG. 5A shows a conventional simple edge design; FIG. 5B shows an edge design with humped profiles; FIG. 5c shows an edge design with humped profiles with a golf ball dimple at the inlet; FIG. 5D shows an edge design with a golf ball profile; and FIG. 5E shows an example embodiment of the cooling fluid passages with beveled edges.

DETAILED DESCRIPTION

Embodiments of the present invention provide a rotor cap for an electric generator, by way of which the disadvantages of the prior art, in particular in the area of cooling the rotor end winding, are at least partially overcome.

A general finding of the invention is that the production of rotor caps from metal and/or alloyed metal with maximum mechanical properties is possible only in a closed form. However, at the same time, the closed embodiment of the rotor caps on both sides of the rotor brings about a considerable limitation with regard to the cooling of the internal conductors in particular in the region of the end winding (cf. in this regard FIGS. 2 and 6). Effective cooling with cooling fluid such as air or hydrogen would ideally take place in the axial direction, said cooling fluid flowing in on one side in the form of a cold fluid flow and being discharged on the opposite side. This effective cooling may be achieved by embodiments of the invention by a rotor cap which is made at least partially of fiber-reinforced plastic and has, at least to some extent, cooling fluid passages in the region of the fiber reinforced plastic.

On account of the mechanical load on the rotor caps, it is possible to produce ventilation slots, ventilation holes and/or other types of fluid passages only to a limited extent in the embodiment in the form of metal and/or alloyed metal, since these would result in excessive mechanical stresses and in reduced reliability and service life of the rotor cap. Against this background, it is part of the prior art that the limited cooling of rotor windings results in limited output in modern turbogenerators. This is the case even when complicated cooling apparatuses, as are described for example in DE 19548321, are taken into consideration. FIG. 1 shows a table which lists the output spectrum of current turbogenerators.

FIG. 1 shows a table which lists turbogenerators, sorted in accordance with output spectrum, and specifies the cooling systems that are predominantly used therein. Some embodiments may be suitable, e.g., for generators having—at least according to this list—air- and/or hydrogen-cooled rotors up to an output of about 1400 MVA.

Figure 2:
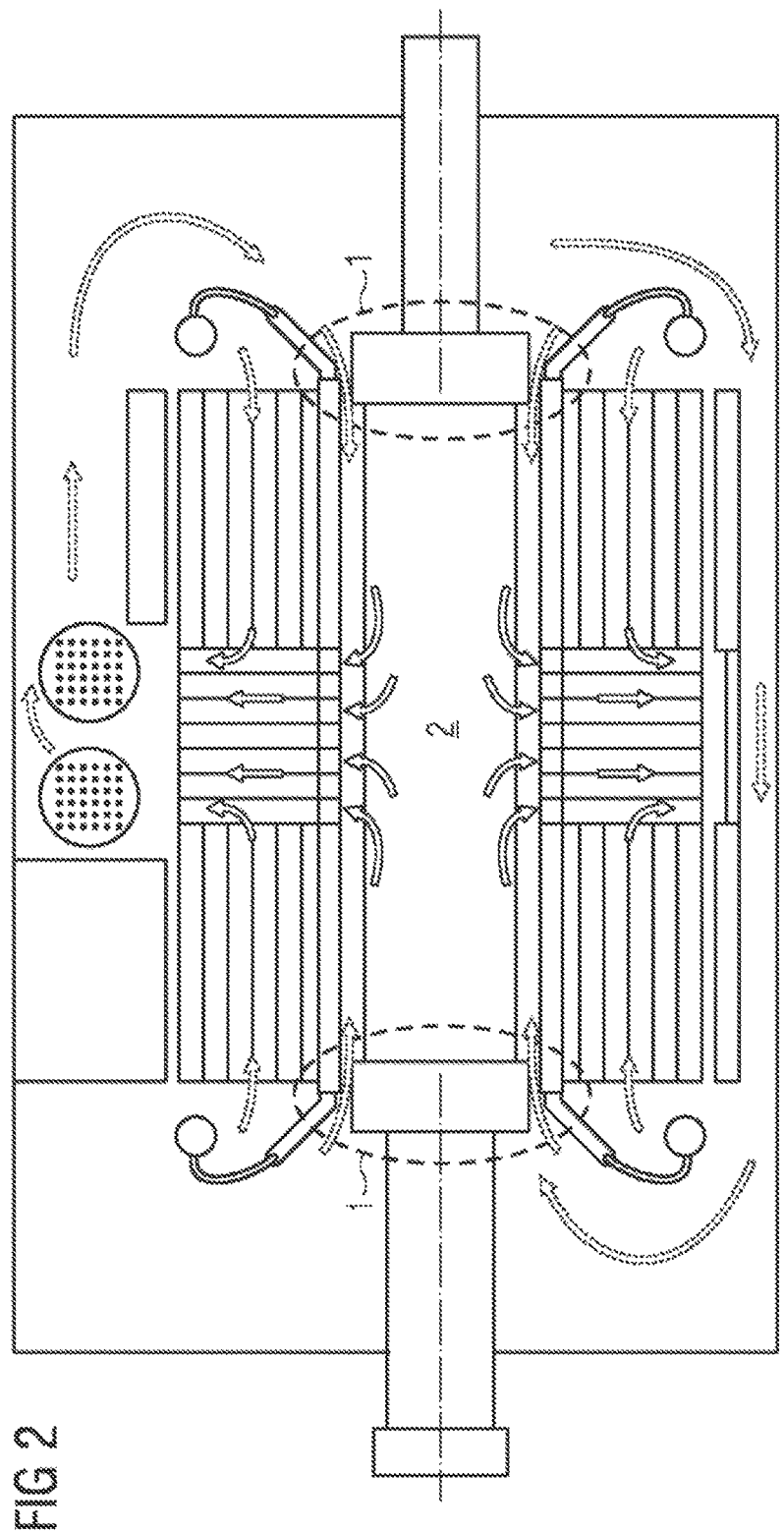
FIG. 2 shows a conventional generator cooling system.
Figure 6:
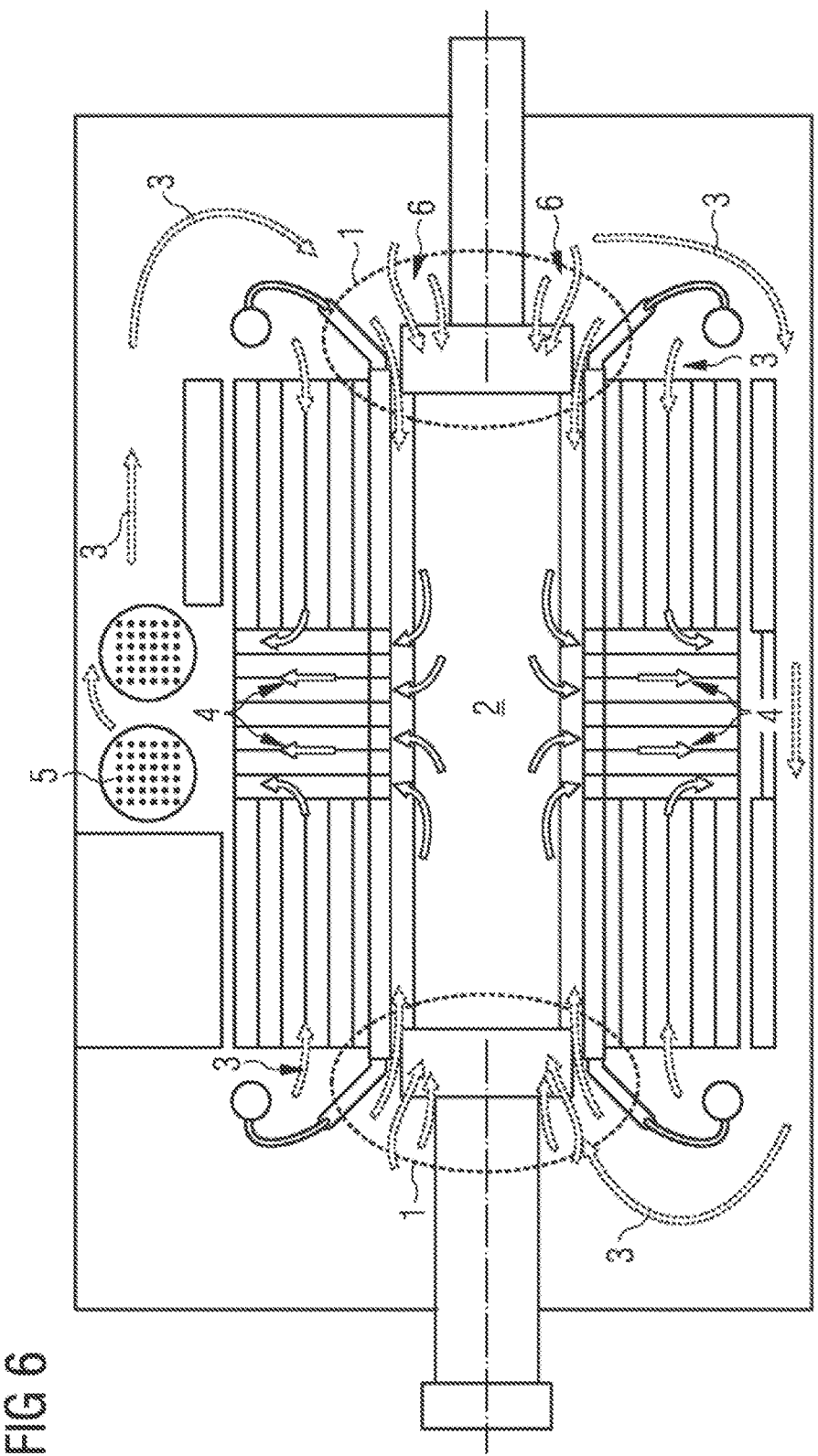
FIG. 6 shows an example generator cooling system, which may provide fluid flows via a rotor cap, according to one embodiment.

FIG. 2 shows the preferred cooling concept of such generators, wherein the rotor caps 1 and the hydrogen-cooled rotor 2. FIG. 2 reproduces the prior art and FIG. 6 the improvement thereto provided by an embodiment of the invention. FIG. 6 shows the same view as FIG. 2, wherein the fluid flows which are possible by the use of a rotor cap according to an embodiment of the invention in the region of the rotor cap are shown in FIG. 6.

FIG. 2 clearly illustrates, by way of the arrows 3, good axial cooling by introduction of cold fluid, which flows into the system, initially in the cold state, from the fluid passages 2, axially cools the rotor 2 in the process and leaves the system again as a heated and used fluid flow 4. It is clear that the fluid flows 3 turn into heated fluid flows 4 by energy intake and are removed from the system again. However, it is also clear that, in the region 1 of the rotor caps—which are marked simply by being encircled by ellipses—on account of the closed construction thereof, cooling of the rotor end winding located there beneath is at least not realized via fluid flows. According to the prior art, no flow takes place there. FIG. 6 shows the same view according to an embodiment of the invention, with the expanded flows, brought about by the use of rotor caps according to an embodiment of the invention, in the region 1 of the rotor caps.

The use of carbon-fiber reinforced plastic materials instead of alloyed steels in rotor caps, as described in DE 10 2011077861.6, reveals the potential which resides in the use of fiber-reinforced plastics at this location.

FIG. 3 shows a conventional rotor cap made of metal compared with a rotor cap made of fiber-reinforced plastic.

FIG. 3 shows an oblique view of a part of a rotor cap 1 of a turbogenerator in a quarter sector section about a longitudinal axis in the region of the rotor cap 1. The rotor cap 1 is mounted on a rotor end 2 in the region of its end side and laterally surrounds a rotor end winding 3.

Figure 3A:
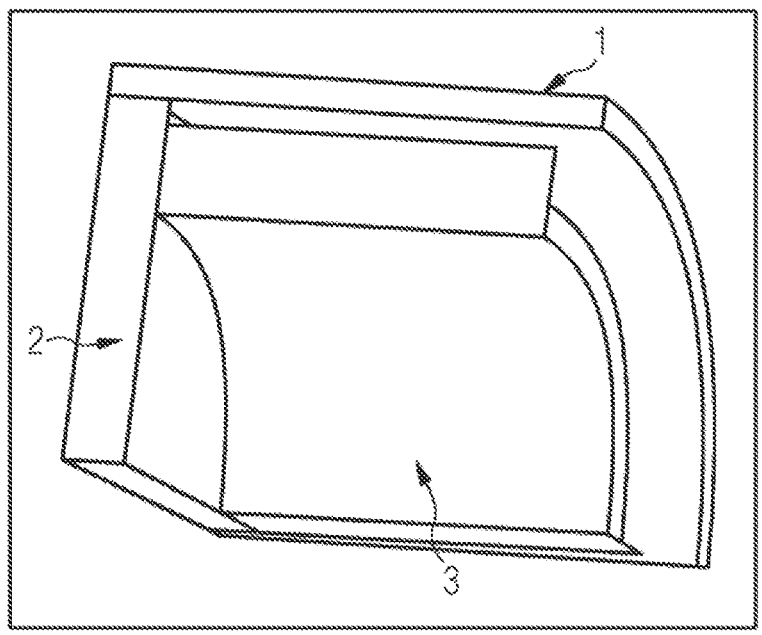
FIG. 3A shows a conventional rotor cap made of metal.

FIG. 3a shows in this case the prior art with a metal rotor cap 1, which is produced for example from steel. The rotor end 2 and the rotor end winding 3 can also be seen.

Figure 3B:
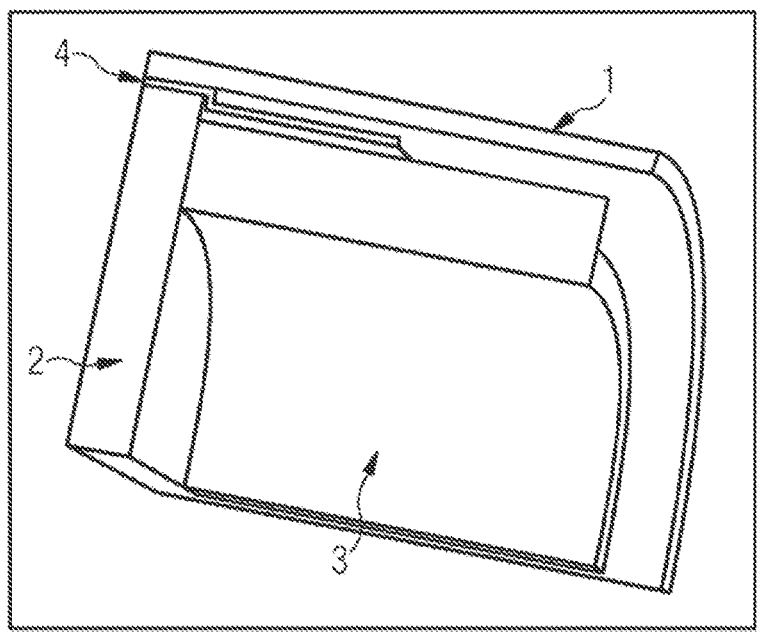
FIG. 3B shows a rotor cap at least partially made of fiber-reinforced plastic, according to one embodiment.

The same view can be seen in FIG. 3b, but in this case a rotor cap 1 made of fiber-reinforced plastic, for example UD-CFRP, is shown. With regard to the configuration of this rotor cap made of fiber-reinforced plastic, reference is made to the full content of the disclosure of DE 102011077861.6.

FIG. 3b also shows, between the rotor cap 1 made of fiber-reinforced plastic and the rotor end winding 3, or the rotor end 2, the metal inlay, i.e. the spacer ring 4.

Some embodiments provide cooling in the region of the rotor cap in that the rotor cap consists at least partially of fiber-reinforced plastic and has ventilation slots, ventilation holes and/or other cooling fluid passages in the region of the fiber-reinforced plastic.

A cooling fluid passage is in this case a ventilation opening in the rotor cap, in particular a gas passage, for example realized as a ventilation slot, as a ventilation hole, as an air and/or gas inlet and outlet, or simply as an opening or hole which passes through the fiber-reinforced plastic. Alternatively, any desired medium other than gas, which is suitable at the location for heat absorption, can also be used as cooling fluid.

According to one embodiment, the rotor cap is made entirely of fiber-reinforced plastic. It is particularly preferred here for the rotor cap to have ventilation slots and/or cooling fluid passages in each case in the main direction of load.

The embodiment which comprises a spacer ring has been found to be particularly advantageous, and in this case in particular the variant in which this spacer ring is provided on its side resting against the fiber-reinforced plastic with a highly conductive layer, preferably made of silver.

The fiber-reinforced plastic can also be referred to as a plastic matrix/fiber composite material.

The fibers can be present or have been provided in particular as (loose) unidirectional fibers, as a woven fabric and/or as a laid fabric.

In a further configuration, the fibers comprise or are carbon fibers. Carbon fibers have the advantage that they allow high-strength matrix/fiber composite materials, are inexpensive, are widely available, are easy to handle in production and are also electrically conductive.

In a further configuration, the fibers comprise ceramic fibers. Ceramic fibers have the advantage of particularly high tensile strength and extensibility and also high-temperature resistance.

The ceramic fibers can be in particular oxidic ceramic fibers, in particular aluminum oxide fibers or silicon dioxide fibers. The ceramic fibers can alternatively or in addition be nonoxidic ceramic fibers, in particular silicon carbide fibers.

In yet another configuration, the fibers comprise boron fibers. These have extremely high strength and stiffness.

In another development, the fibers comprise aramid fibers. Aramid fibers are distinguished by very high strength, high impact strength, high elongation at break, good vibration damping and high resistance to acids and alkalis. They are moreover extremely heat- and fire-resistant.

In a further configuration, the fibers are embedded in a plastic matrix of resin, in particular epoxy resin. Epoxy resin is well known as a matrix material for fibers and controllable. Epoxy resin also has a high strength and chemical resistance. However, other plastics, in particular thermosetting plastics, are also usable.

In another configuration, the rotor cap is produced entirely from the fiber-reinforced plastic.

In a further configuration, the rotor cap has a spacer ring ("inlay") intended as a bearing surface on its inner side. This can be produced from metal and/or be coated with a metal layer, in particular also with a silver layer. According to a preferred embodiment, the spacer ring has, on its side resting against the fiber-reinforced plastic, a highly electrically conductive coating, in particular a silver coating.

In one embodiment, the fibers have at least one preferred direction. Thus, particularly high strength in the direction of particularly high loads can be achieved, this reducing the probability of failure occurring, for example on account of crack formation, and increasing the service life. This preferred direction is then referred to for example as the main direction of load.

In one configuration, ventilation slots, ventilation holes and/or other cooling fluid passages are arranged in the main direction of load.

In one configuration, the at least one preferred direction comprises in particular at least substantially a circumferential direction of the rotor cap. Thus, in particular mechanical loads, in particular tensile stresses, which are based on circumferential expansion caused by centrifugal forces, can be taken into account. A circumferential direction can be understood as meaning in particular a direction of a changing azimuth angle with regard to an axis of rotation or longitudinal axis of the rotor cap.

FIG. 4 shows three exemplary embodiments of cooling fluid passages as are realized for example in the fiber-reinforced plastic of the rotor cap.

In this case, FIG. 4a shows, represented by the arrow 7, the preferred direction within the fiber-reinforced plastic, and the ventilation holes 8, which serve as the cooling fluid passage. FIG. 4b again shows the preferred direction or main direction of load of the fiber-reinforced plastic and in addition the ventilation slots 9 which extend obliquely to the main direction of load. Finally, FIG. 4c shows a further embodiment with ventilation slots 10 which extend in the main direction of load or preferred direction 7 of the fiber-reinforced plastic.

Furthermore, any desired further variants of cooling fluid passages within the meaning of the present invention are. They preferably lie in the radial direction, from the inside to the outside, in order to ensure fluid exchange, in particular gas exchange. The cooling fluid passages can in this case lead directly in the radial direction through the rotor cap or, to improve incident flow, obliquely through the thickness direction of the rotor cap.

The cooling fluid passages can, in accordance with the variants specified in FIG. 5, in addition to a simple variant, for example as illustrated in 5a) of FIG. 5, also be designed in a flow-influencing manner or in some other way at the edges 11 of the cooling fluid passages. A number of types of the design of the edges 11 of the cooling fluid passages are illustrated by way of example in FIG. 5.

The edges 11, just like the cooling fluid passages 8, 9 and 10, can be formed differently or identically within a rotor cap and be combined in a uniform or different manner in subregions, depending on the embodiment. The outer and inner edges 11 of a cooling fluid passage 8, 9 and/or 10 of the rotor cap 1 can in this case be formed identically or differently. Likewise, opposing edges 11 of the outer or inner side of a cooling fluid passage can be different from one another or identical.

FIG. 5 shows a few exemplary embodiments of the design of the edges 11 of the cooling fluid passages in rotor caps.

Figure 5A:
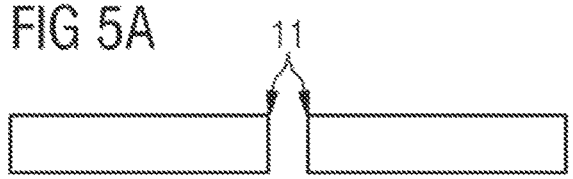
FIGS. 5A-5E show example designs of the edges of cooling fluid passages a rotor cap.

FIG. 5a shows the conventional very simple edge design.

Figure 5B:

FIG. 5b shows the design of the edges 11 with what are known as humped profiles.

Figure 5C:
Figure 5D:

FIG. 5c shows a development of the design of the edges 11 with what are known as humped profiles with a golf ball dimple at the inlet, and FIG. 5d shows a design of the edges 11 with what is known as a golf ball profile.

Figure 5E:
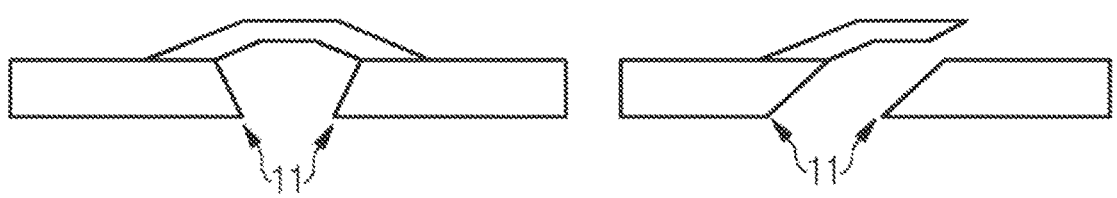

FIG. 5e shows a further embodiment of the cooling fluid passages with beveled edges 11. Said figure shows a structure similar to that of a grater with a cross-section e) which, upon axial incident flow, feeds the cooling fluid, for example the cold air, radially into the interior of the rotor cap with smooth redirection.

With regard to its fiber-reinforced plastic, the rotor cap can be produced by means of filament winding, by means of resin transfer molding (RTM) and/or by means of prepreg technology, for example.

These production methods allow flexible and efficient production by lamination.

In order to produce the cooling fluid passages, the following solutions that are suitable and specific for fiber composites can be used.

Introduction of the cooling fluid passages following rotor cap production: In this case, the polymeric fiber composite rotor cap can be finish-machined following production. By way of drills and/or milling cutters, the abovementioned geometries at cooling fluid passages can be introduced axially or radially into the rotor cap.

However, particular preference is given to the production approach in which, during the lamination of the fiber composite plastic, the cooling fluid passages are formed by insertion of inserts, for example of cylindrical inserts, in the axial direction. These can consist of metal and of CFRP, GFRP or other plastics or composites. Furthermore, a spoke wheel is conceivable, which comprises an inner and an outer ring in which the fibers are located preferably in the circumferential direction. Introduced between these rings are CFRP struts or spokes which connect the two rings together in a torsion-resistant manner with respect to centrifugal and/or axial force. In order to realize the air flow through the thickness direction of the cap (radial direction), two CFRP rings are possible, which are realized with a gap in the cap circumference. This gap can be produced with axial "spokes" in order to connect the two rings.

Suitable materials for producing the CFRP rotor cap are polyacrylonitrile (PAN)-based carbon fibers that are conventional for the structural-mechanical main body. For increased rigidity and at the same time increased thermal conductivity of the CFRP structures, what are known as high modulus fibers, which are produced on the basis of pitch, can be used in part or entirely. Furthermore, in order to increase the thermal conductivity of the CFRP, a particle filling of the polymer matrix with graphite, short carbon fibers, aluminum-based, copper-based and/or silver-based metal particles and any desired alloys thereof and/or of thermally conductive metal compounds such as nitrides, for example boron nitride, or oxides, is possible.

In one development, the at least one preferred direction comprises precisely one preferred direction, i.e. the fibers are oriented unidirectionally at least locally. As a result, particularly high strength can be achieved in this preferred direction.

FIG. 6 shows the improved cooling of a rotor end winding when use is made of the rotor caps according to one embodiment. Compared with FIG. 2, it is clear here that further cooling fluid flows 6 pass through the rotor caps in order to cool the rotor end winding in the region 1 of the rotor caps.

Although the invention has been described and illustrated in more detail, the invention is not limited thereto and other variations can be derived therefrom by a person skilled in the art without departing from the scope of the invention.

The invention relates to a rotor cap for an electric generator and to a production method therefor. The invention also relates to such a generator. The invention is applicable particularly advantageously in high speed turbo generators. In this case, the rotor cap (1) consists at least partially of fiber-reinforced plastic. In the region of the fiber-reinforced plastic, the rotor cap (1) has cooling fluid passages, particularly preferably in the axial direction, i.e. outwardly from the inner side, adjoining the rotor end winding (3), of the rotor cap (1).

What is claimed is:

1. A rotor cap for an electric generator, the rotor cap comprising:
    fiber-reinforced plastic, the fiber-reinforced plastic defining a preferred direction in relation to stress resistance;
    a spacer ring comprising a bearing surface on an inner side of the rotor cap and a metal layer adjacent at least a portion of the fiber-reinforced plastic;
    cooling fluid passages formed in the fiber-reinforced plastic portion of the rotor cap;
    wherein the cooling fluid passages comprise at least one arrangement selected from the group consisting of: an array of ventilation holes in staggered rows along the preferred direction, slots extending obliquely to the preferred direction, and an array of slots extending parallel to the preferred direction in staggered rows along the preferred direction.

2. The rotor cap of claim 1, wherein the fiber-reinforced plastic comprises fibers having at least one preferred direction including a circumferential direction of the rotor cap.

3. The rotor cap of claim 1, wherein fibers of the fiber-reinforced plastic comprise carbon fibers.

4. The rotor cap of claim 1, wherein fibers of the fiber-reinforced plastic comprise ceramic fibers.

5. The rotor cap of claim 1, wherein fibers of the fiber-reinforced plastic comprise boron fibers.

6. The rotor cap of claim 1, wherein fibers of the fiber-reinforced plastic are embedded in a matrix of resin.

7. The rotor cap of claim 1, wherein the cooling fluid passages comprise gas passages.

8. The rotor cap of claim 1, wherein the cooling fluid passages have edges comprising at least one feature selected from the group consisting of: humped profiles, a golf ball dimple, a golf ball profile, and beveled edges.

9. An electric turbogenerator comprising:
    a rotor cap,
    wherein the rotor cap comprises:
        fiber-reinforced plastic, the fiber-reinforced plastic defining a preferred direction in relation to stress resistance; and
        a spacer ring comprising a bearing surface on an inner side of the rotor cap and a metal layer adjacent at least a portion of the fiber-reinforced plastic;
    wherein cooling fluid passages are formed in the fiber-reinforced plastic portion of each rotor cap;
    wherein the cooling fluid passages comprise at least one arrangement selected from the group consisting of: an array of ventilation holes in staggered rows along the preferred direction, slots extending obliquely to the preferred direction, and an array of slots extending parallel to the preferred direction in staggered rows along the preferred direction.

10. The rotor cap of claim 1, wherein fibers of the fiber-reinforced plastic comprise aluminum oxide fibers.

* * * * *